US012273421B2

(12) United States Patent
Devanagondi et al.

(10) Patent No.: US 12,273,421 B2
(45) Date of Patent: Apr. 8, 2025

(54) DISTRIBUTED SPLIT EDGE APPLICATION ARCHITECTURE

(71) Applicant: Lilac Cloud, Inc., Saratoga, CA (US)

(72) Inventors: Harish Ramamurthy Devanagondi, Saratoga, CA (US); Jay Shah, Morgan Hill, CA (US); Simon Luigi Sabato, Saratoga, CA (US); Srikanth Lakshminarasimhan, Bangalore (IN)

(73) Assignee: LILAC CLOUD, INC., Seattle, WA (US)

(*) Notice: Subject to any disclaimer, the term of this patent is extended or adjusted under 35 U.S.C. 154(b) by 24 days.

(21) Appl. No.: 18/112,409

(22) Filed: Mar. 24, 2023

(65) Prior Publication Data

US 2023/0396684 A1    Dec. 7, 2023

Related U.S. Application Data

(63) Continuation of application No. 17/672,487, filed on Feb. 15, 2022, now Pat. No. 11,616,849.

(60) Provisional application No. 63/149,650, filed on Feb. 15, 2021.

(51) Int. Cl.
*G06F 15/16* (2006.01)
*H04L 67/289* (2022.01)
*H04L 67/5651* (2022.01)

(52) U.S. Cl.
CPC ........ *H04L 67/289* (2013.01); *H04L 67/5651* (2022.05)

(58) Field of Classification Search
CPC .......................... H04L 67/289; H04L 67/5651
USPC ......................................................... 709/203
See application file for complete search history.

(56) References Cited

U.S. PATENT DOCUMENTS

| 5,732,273 | A | 3/1998 | Srivastava et al. |
| 5,774,728 | A | 6/1998 | Breslau et al. |
| 8,418,155 | B2 | 4/2013 | McAllister et al. |
| 8,468,510 | B1 | 6/2013 | Sundararajan et al. |
| 9,166,862 | B1 * | 10/2015 | Davis ..................... H04L 67/56 |
| 9,563,754 | B2 | 2/2017 | Colnot et al. |
| 9,621,399 | B1 * | 4/2017 | Parakh ............... H04L 67/2885 |
| 9,946,657 | B1 * | 4/2018 | Muthukkaruppan ....................... G06F 12/0897 |
| 10,120,661 | B2 | 11/2018 | Sandberg et al. |

(Continued)

FOREIGN PATENT DOCUMENTS

WO     2016/116132 A1    7/2016

*Primary Examiner* — Alicia Baturay
(74) *Attorney, Agent, or Firm* — TROUTMAN PEPPER LOCKE LLP

(57) ABSTRACT

In an embodiment, application delivery to end-user devices may be handled by a combination of an application device and a distributed set of split edge devices located closer to the end-user device within a network. The split edge devices are instructed by the application device about how to manage traffic to and from the end-user devices. The application device determines whether content is stored to content cache of a split edge device. The application device, when the content is stored to the split edge device, refrains from sending the content and instead sends instructions to the split edge device that include reference to a location of the (Continued)

content, and instruct the split edge device to send the content to an application and/or device. The application device, when the content is not stored to the split edge device, sends the content with instructions to store the content locally.

21 Claims, 11 Drawing Sheets

(56) References Cited

U.S. PATENT DOCUMENTS

| | | | |
|---|---|---|---|
| 10,162,626 B2* | 12/2018 | Mavrinac | G06F 8/70 |
| 10,230,695 B2* | 3/2019 | Cline | H04L 63/0281 |
| 10,235,291 B1* | 3/2019 | Michaud | G06F 3/0604 |
| 10,270,878 B1* | 4/2019 | Uppal | H04L 45/02 |
| 10,298,713 B2* | 5/2019 | Li | H04L 67/34 |
| 10,404,823 B2* | 9/2019 | Busayarat | G06F 12/0868 |
| 10,412,110 B2* | 9/2019 | Hamdi | G06F 7/24 |
| 10,531,130 B2* | 1/2020 | Beck | H04N 21/23106 |
| 10,656,935 B2* | 5/2020 | Busayarat | H04N 21/4826 |
| 10,873,516 B2* | 12/2020 | Lemmons | H04L 43/16 |
| 10,938,884 B1* | 3/2021 | Baldwin | H04L 69/22 |
| 10,942,852 B1* | 3/2021 | Tian | G06F 12/0868 |
| 10,958,700 B1* | 3/2021 | Hassler | H04N 21/2408 |
| 10,963,388 B2* | 3/2021 | Sinha | G06F 12/0862 |
| 10,972,761 B2* | 4/2021 | Ra | H04N 21/8456 |
| 11,030,104 B1* | 6/2021 | Gupta | G06F 12/0895 |
| 11,032,581 B2* | 6/2021 | Beck | H04L 65/80 |
| 11,061,828 B1* | 7/2021 | Peterson | G06F 12/0875 |
| 11,070,603 B2* | 7/2021 | Panagos | H04L 61/106 |
| 11,086,960 B2* | 8/2021 | Newton | G06F 21/64 |
| 11,109,101 B1* | 8/2021 | Binder | H04N 21/8456 |
| 11,128,728 B2* | 9/2021 | Luft | H04L 67/563 |
| 11,134,134 B2* | 9/2021 | Uppal | H04L 67/52 |
| 11,146,488 B2* | 10/2021 | Hao | H04L 45/64 |
| 11,146,654 B2* | 10/2021 | Busayarat | G06F 12/0811 |
| 11,151,058 B2* | 10/2021 | Gupta | G06F 12/123 |
| 11,159,404 B1 | 10/2021 | Kuo et al. | |
| 11,218,504 B2* | 1/2022 | Hamdi | G06F 7/24 |
| 11,218,561 B1* | 1/2022 | Mondal | H04L 67/568 |
| 11,252,253 B2* | 2/2022 | Luft | H04L 49/90 |
| 11,281,804 B1* | 3/2022 | Uthaman | H04L 63/123 |
| 11,297,119 B2* | 4/2022 | Hassler | H04L 65/613 |
| 11,310,334 B1* | 4/2022 | Adolphson | H04L 67/02 |
| 11,323,536 B2* | 5/2022 | Luft | H04L 65/1026 |
| 11,349,737 B2* | 5/2022 | Lemmons | H04L 43/50 |
| 11,356,712 B2* | 6/2022 | Ra | H04N 21/23113 |
| 11,388,252 B2* | 7/2022 | Luft | H04L 67/5682 |
| 11,481,825 B1* | 10/2022 | Mokashi | G06Q 30/0637 |
| 11,616,849 B2* | 3/2023 | Devanagondi | H04L 67/564 709/203 |
| 2006/0155997 A1* | 7/2006 | Fritzges | H04L 63/0428 713/171 |
| 2012/0126851 A1 | 5/2012 | Kelem et al. | |
| 2016/0188340 A1 | 6/2016 | Fushimi | |
| 2017/0052830 A1 | 2/2017 | Gambardella et al. | |
| 2020/0259918 A1* | 8/2020 | Luft | H04L 67/568 |
| 2021/0224200 A1* | 7/2021 | Gupta | G06F 12/0897 |
| 2021/0227264 A1* | 7/2021 | Ra | H04L 65/765 |
| 2021/0255964 A1* | 8/2021 | Gupta | G06F 12/123 |
| 2021/0255965 A1* | 8/2021 | Gupta | G06F 12/0811 |
| 2021/0255967 A1* | 8/2021 | Gupta | G06F 12/127 |
| 2021/0263863 A1* | 8/2021 | Peterson | G06F 12/0875 |
| 2021/0279174 A1* | 9/2021 | Peterson | G06F 12/0875 |
| 2022/0019440 A1* | 1/2022 | Gorti | G06F 9/3861 |
| 2022/0027267 A1* | 1/2022 | Gupta | G06F 12/0802 |
| 2022/0027272 A1* | 1/2022 | Ki | G06F 3/0635 |
| 2022/0188174 A1* | 6/2022 | Bairavasundaram | H04L 41/0823 |
| 2022/0188242 A1* | 6/2022 | Tanpairoj | G06F 12/0811 |

* cited by examiner

DISTRIBUTED SPLIT EDGE APPLICATION ARCHITECTURE

INCORPORATION BY REFERENCE; DISCLAIMER

The following applications are hereby incorporated by reference: application Ser. No. 17/672,487 filed on Feb. 15, 2022; application No. 63/149,650 filed on Feb. 15, 2021. The Applicant hereby rescinds any disclaimer of claim scope in the parent application(s) or the prosecution history thereof and advises the USPTO that the claims in this application may be broader than any claim in the parent application(s).

TECHNICAL FIELD

The disclosure generally relates to content delivery networks, and more particularly to a distributed edge architecture for a content delivery network.

BACKGROUND

In a typical content delivery network (CDN), edge cluster servers are configured to receive requests for content from downstream devices, retrieve the content from one or more upstream source devices or networks, and deliver the retrieved content to each device which has requested the content via one or more downstream networks.

In these CDNs, the retrieval of the content and delivery to the requesting device are performed on a one-to-one basis. Therefore, for popular content which is being requested and consumed by multiple devices at once, large amounts of data need to be transmitted from the source, through the network to the edge cluster server, and then further through the network to each requesting device.

BRIEF DESCRIPTION OF THE DRAWINGS

Reference symbols in the various drawings that have the same number indicate like elements.

DETAILED DESCRIPTION

Figure 1:
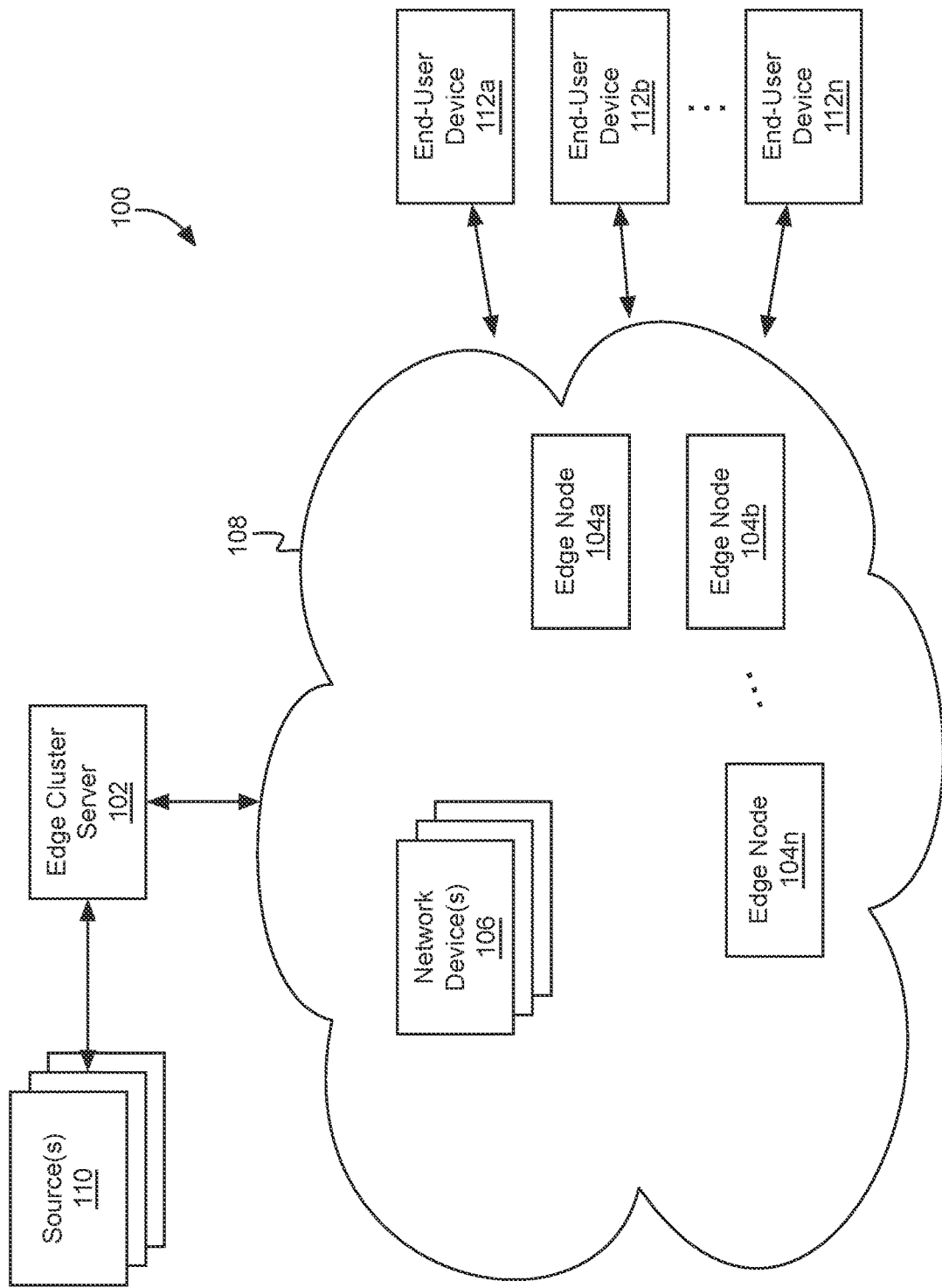
FIG. 1 illustrates an example system for content delivery.

In the following descriptions, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

Details of particular embodiments are provided with respect to the various drawings and the descriptions below. Other enhancements, features, details, and/or advantages of the particular embodiments may be ascertainable by those of skill in the art upon reading the present descriptions and viewing the drawings.

Also, the particular embodiments described herein may be implemented in any computing system environment known in the art, which may include one or more processors and a computer-readable medium configured to store logic, the logic being implemented with and/or executable by the one or more processors to cause the one or more processors to perform operations specified by the logic.

The descriptions presented herein relay sufficient information to enable a person having ordinary skill in the art to make and use the present invention and are provided in the context and requirements of particular embodiments of the present invention.

It is also noted that various modifications to the disclosed embodiments will be readily apparent to a person having ordinary skill in the art and the general principles defined herein may be applied to other embodiments and applications without departing from the spirit and scope of the present invention. Thus, the present invention is not intended to be limited to the embodiments shown and described herein, but is to be accorded the widest scope consistent with the principles and features disclosed herein.

Also, unless otherwise specifically defined herein, all terms are to be given their broadest possible interpretation including meanings implied from the specification as well as meanings understood by a person having ordinary skill in the art and/or as defined in dictionaries, treatises, etc.

Moreover, the term "about" when used herein to modify a value indicates a range that includes the value and less and greater than the value within a reasonable range. In the absence of any other indication, this reasonable range is plus and minus 10% of the value. For example, "about 10 milliseconds" indicates 10 ms±1 ms, such that the range includes all values in a range including 9 ms up to and including 11 ms. In addition, the term "comprise" indicates an inclusive list of those elements specifically described without exclusion of any other elements. For example, "a list comprises red and green" indicates that the list includes, but is not limited to, red and green. Therefore, the list may also include other colors not specifically described.

1. GENERAL OVERVIEW
2. SYSTEM ARCHITECTURE
   2.1 CONTENT DELIVERY NETWORK MODEL
   2.2 SPLIT EDGE MODEL FOR CONTENT DELIVERY
   2.3 CONVERGED EDGE MODEL FOR CONTENT DELIVERY

3. EXAMPLE EMBODIMENTS
  3.1 DATA FLOW FOR AN INITIAL REQUEST FOR CONTENT
  3.2 DATA FLOW FOR SUBSEQUENT REQUESTS FOR CONTENT
  3.3 EXAMPLE PACKETS FOR CONTENT DELIVERY
  3.4 METHOD FOR PROVIDING CONTENT USING AN APPLICATION DEVICE
  3.5 METHOD FOR PROVIDING CONTENT USING AN APPLICATION DEVICE
  3.6 METHOD FOR PROVIDING CONTENT USING A SPLIT EDGE DEVICE
  3.7 METHOD FOR PROVIDING CONTENT USING A SPLIT EDGE DEVICE
4. MISCELLANEOUS; EXTENSIONS
5. HARDWARE OVERVIEW

1. GENERAL OVERVIEW

One or more embodiments include an application device configured to determine whether an instance of content is stored to content cache of a split edge device in a network based on occurrence of a triggering condition. The application device runs the application stack to process application-layer requests from end-user devices and executes all the application policy and business logic for servicing such requests, including application-layer protocols. The application device also runs the transport stack to communicate with each end-user device. Because application device manages the application stack and transport stack, control and management of this functionality may be absent and/or not reside on the split edge device in an embodiment, conserving its processing capacity. In this embodiment, the split edge device relies on instructions from the application device to determine whether and how to handle processing of data, in some instances, based on instructions provided by the application device via the transport stack.

The application device, responsive to a determination that the content is stored to content cache of the split edge device, sends instructions to the split edge device that include reference to a location of the content in content cache and instruct the split edge device to send the content to a particular application and/or device. Moreover, the application device refrains from sending the content. The application device, responsive to a determination that the content is not stored to content cache of the split edge device, sends the content to the split edge device for delivery to the particular application and/or device along with instructions that include reference to a location to store the content in content cache.

One or more embodiments a split edge device passes an application-layer request to an application device via a network. The split edge device acts as a pass-through for this application-layer request for content which may be initiated by an end-user device in communication with the application device. The split edge device, responsive to a determination by the application device that the content is stored to local content cache of the split edge device, receives instructions indicating that the content is stored in the local content cache and instructions to provide the content to a particular end-user device. However, responsive to the application-layer request and a determination by the application device that the content is not stored to the local content cache of the split edge device, the split edge device receives an instance of the requested content from the application device along with instructions dictating to store it locally. The split edge device stores the received content (e.g., at a specified location in the local content cache of the split edge device) if it is not already stored to the content cache. Furthermore, based on a decision by the application device to send the content to a particular end-user device, the application device sends further instructions to the split edge device which identify particular end-user device(s) for delivery of the content. Responsive to the further instructions, the split edge device retrieves the stored content from the local content cache and delivers it to the particular end-user device(s) according to the further instructions.

This Specification may include, and the claims may recite, some embodiments beyond those that are described in this General Overview section.

2. SYSTEM ARCHITECTURE 2.1 Content Delivery Network Model

FIG. 1 illustrates an example system 100 for providing content to end-user devices 112. System 100 includes a network 108, at least one edge cluster server 102 (which may be arranged in a cluster of edge cluster servers 102 for sharing workload therebetween), one or more sources 110 of content, and a plurality of end-user devices 112 (e.g., end-user device 112a, end-user device 112b, . . . , end-user device 112n) connected to network 108 via one or more edge nodes 104 (e.g., edge node 104a, edge node 104b, . . . , edge node 104n).

Sources 110 of content may include any devices, networks, and/or storage accessible to edge cluster server 102 from which content may be retrieved and/or requested for delivery to end-user devices 112. Some example sources include the Internet, cache and/or memory of edge cluster server 112, content servers, etc. Edge cluster server 102 may be connected to source(s) 110 via a fabric relay, in one approach, and/or via one or more additional networks.

Network 108 includes at least one edge node 104 for connecting to end-user devices 112 and one or more network devices 106 disposed within network 108 at appropriate locations for routing, transmitting, switching, and processing data within network 108 and to/from devices external to network 108. The network device(s) 106 may be configured to operate a data plane and a control plane, in various approaches, and are configured to connect various devices within and/or external to network 108. Network 108 may be a wireline network, a wireless network, or a combination thereof. In one embodiment, network 108 may be an edge network, e.g., for wireless end-user devices.

For a wireless network, network device(s) 106 may include one or more Gi local area network (LAN) devices, N6 LAN devices, packet data network gateway (P-GW) devices, serving gateway (S-GW) devices, evolved packet core (EPC) devices, mobile backhaul (MBH) devices, wireless routers, wireless switches, radio receiver devices, radio transmitter devices, etc.

For a wireline network, network device(s) 106 may include one or more broadband network gateway (BNG) devices, residential gateway (RG) devices, customer premises equipment (CPE) devices, ethernet devices, fiber devices, routers, switches, etc.

In one or more embodiments, system 100 may include more or fewer components than the components illustrated in FIG. 1. The components illustrated in FIG. 1 may be local to or remote from each other. The components illustrated in FIG. 1 may be implemented in hardware and/or software in various approaches. Operations described with respect to one component may instead be performed by another component.

In one or more embodiments, a data repository may be used to store information for system 100, and may be any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or may execute on the same computing system as system 100. Alternatively or additionally, a data repository may be implemented or executed on a computing system separate from system 100. Also, a data repository may be communicatively coupled to any device in system 100 for transmission and receipt of data via a direct connection or via a network.

When a particular end-user device 112 (such as end-user device 112b) generates a request for content, this request is received by an edge node 104 (such as edge node 104a) and is transmitted through network 108 up to edge cluster server 102. Edge cluster server 102 processes this content request, determines where the content is located in source(s) 110, obtains the content, and transmits the content down through the network 108 out to end-user device 112b. Each time another end-user device 112 requests the same content, this process is repeated, which causes unnecessary data to be transmitted through network 108 for repeated content requests, tying up bandwidth and processing capacity of network 108.

2.2 Split Edge Model for Content Delivery

Figure 2:
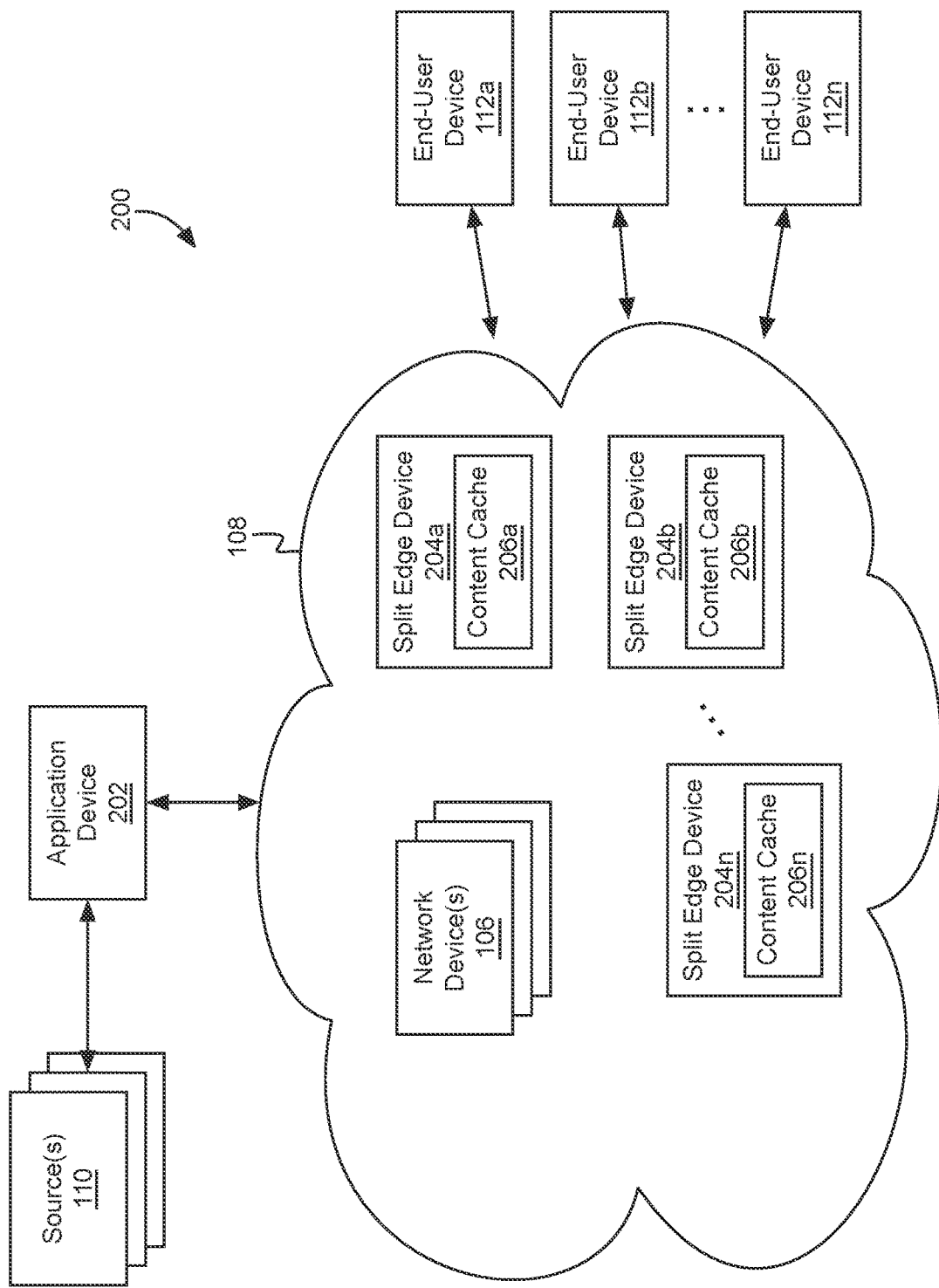
FIG. 2 illustrates an example system for content delivery in accordance with one or more embodiments.

FIG. 2 illustrates an example system 200 for providing content to end-user devices 112 using a split edge model. System 200 includes a network 108, at least one application device 202 (which may be arranged in a cluster having multiple application devices 202 intelligently grouped together for sharing workload therebetween), one or more sources 110 of content, and a plurality of end-user devices 112 (e.g., end-user device 112a, end-user device 112b, . . . , end-user device 112n) connected to network 108.

Application device 202 is configured to receive and process application-layer content requests from end-user devices 112 which are delivered to application device 202 via network 108. In one embodiment, application device 202 may be connected to network 108 via any of the various network device 106. Application device 202 is also configured to interact with one or more split edge devices 204 (e.g., split edge device 204a, split edge device 204b, . . . , split edge device 204n) within network 108 for delivering content to end-user devices 112, as explained in more detail later.

An end-user device 112 is a device which consumes or uses the application and content thereof. Application device 202 serves the application to the end-user device(s) 112 and one or more split edge devices 204 are disposed between application device 202 end-user device 112. A split edge device 204 can not natively perform functions of the application device 202, but instead participates in the application-layer management through interaction with application device 202.

In one embodiment, application device 202 runs the application stack to process application-layer requests from end-user devices 112 and executes all the application policy and business logic for servicing such requests, including application-layer protocols such as, hypertext transfer protocol (HTTP), hypertext transfer protocol secure (HTTPS), web real-time communication (WebRTC), etc. Application device 202 also runs the transport stack to communicate with each end-user device 112. For example, transmission control protocol (TCP)/internet protocol (IP), user datagram protocol (UDP), QUIC, and/or other transport layer protocols. Because application device manages the application stack and transport stack, this functionality is not resident on any of the split edge devices 204, conserving their processing capacity.

These devices are referred to as "split edge devices" because application-layer specific data which, in system 100 of FIG. 1, would be handled exclusively by edge cluster server 102, are instead "split" between one or more application devices 202 and a plurality of split edge devices 204 to conserve resources within network 108 by reducing an amount of data (e.g., content) that is transmitted through network 108 to deliver the content to end-user devices 112 connected to network 108.

In one embodiment, split edge devices 204 may be a set-top box installed at consumer sites (such as homes, restaurants, etc.), a subscriber-premise-equipment in an enterprise or business, etc. What is relevant about the split edge devices 204 is that the application-layer duties are split across (e.g., shared) the application device 202 and a distributed collection of split edge devices 204. The split edge devices 204 are not aware of the application-layer functionality or processing that takes place on application device 202. Typically, application-layer processing occurs on the edge cluster server 102, as shown in system 100 of FIG. 1. The devices are referred to herein as "edge" devices because the devices are located closer to the end-user devices 112 than application device 202. However, the actual edge may be in the network 108 or outside of the network 108, depending on an understanding or definition of the extents of the network 108.

FIG. 2 illustrates a single network 108 and associated devices connected thereto, but this architecture may be duplicated many times over in an actual installation to serve an almost limitless number of end-user devices 112.

In an embodiment, application device 202 may be located remotely from split edge devices 204. For example, application device 202 may be located in a different room in the same building, at a different building at the same site, or in a different site entirely.

In another approach, application device 202 may be located proximate and/or near to one or more split edge devices 204, such as in the same room, in the same server rack, in the same chassis, etc. In this approach, application device 202 may share resources (e.g., processors, memory, connections, etc.) with one or more split edge devices 204.

Application device 202 is also configured to handle all management, processing, security, and policy decisions for the application-layer across network 108. Therefore, an application-layer request for content will be transmitted to application device 202 for processing, as other devices within network 108 will typically be unable to understand and/or process the application-layer request. Other application-layer related data may also be forwarded to application device 202 for processing in additional embodiments, instead of being handled by any split edge device 204.

In one embodiment, each split edge device 204 is in communication with a related content cache 206 (e.g., split edge device 204a is in communication with content cache 206a, split edge device 204b is in communication with content cache 206b, . . . , split edge device 204n is in communication with content cache 206n). In a further embodiment, content cache 206 may be integrated with split edge device 204 (e.g., content cache 206a is integrated with split edge device 204a and is only accessible to split edge device 204a).

In one embodiment, content cache 206 may be treated as a universal cache for storing content therein, as directed by application device 202, thereby enabling the data stored in each content cache 206 to be known by application device 202 and controlled by application device 202. Application device 202 may control what data is stored to content cache 206 by sending instructions to the individual split edge devices 204. Each split edge device 204 is configured to store content (and possibly other data, such as metadata, non-content information, etc.) to content cache 206 upon receiving the content, e.g., from application device 202 via network 108. Each split edge device 204 is also configured to retrieve content from content cache 206, and deliver the retrieved content to one or more end-user devices 112, such as in response to an application-layer request for content sent by the one or more end-user devices 112 and processed by application device 202.

In one embodiment, at least one split edge device 204 may include a command-aware hardware architecture which is configured to generate and/or execute command bundles, including command bundles sent from application device 202. The command-aware hardware architecture may be implemented in a field programmable gate array (FPGA), application specific integrated circuit (ASIC), or some other hardware device that is able to efficiently process command bundles.

Each command bundle is an "executable" that encodes all or some operations generated by application device 202. A command bundle is a compact, generic, hardware-independent format that may be used to describe any program to be executed on a command-aware hardware architecture.

Each command in a command bundle is a logically independent and atomic operation. Each command is potentially complex in that it may require multiple discrete functions to be performed to execute the command. Each command also clearly defines a set of inputs (data and arguments, which may be null) and a set of outputs (which may simple or complex, e.g., a flag, 0 or 1, an argument, a value or set of values, a function, etc.).

Application device 202 may transmit a command bundle to a split edge device 204 for execution thereof by a single hardware platform. The command bundle may include instructions for how to handle content, where to find content, where to deliver content, etc. Accordingly, each command in a command bundle may be executed on a single hardware entity. That single hardware entity may be the entirety of the command-aware hardware architecture of at least one split edge device 204 in one approach. In another approach, that single hardware entity may be a single hardware module in a command-aware hardware processor of another split edge device 204. Multiple commands in a command bundle may be executed on the same hardware entity, one command at a time.

In some approaches, a command bundle may be specific to a particular hardware platform within a split edge device 204 in order for the particular hardware platform to understand the commands in the command bundle and provide an output upon execution of the various commands. This approach is useful when the particular hardware platform is of a type that requires commands to be presented in a specific format (e.g., a CPU, a GPU, etc.).

According to one embodiment, application device 202 may include a command-aware architecture that is configured to generate and/or execute command bundles, as described with respect to split edge devices 204 above.

In one approach, instructions may be sent by the application device in a command bundle. In a further embodiment, a command bundle may include content, such as one or more parameters or arguments, with or within the command bundle. This command bundle may also include instructions, as a set of commands, that dictate instructions for how to handle content, where to find content, where to store the content, where to deliver content, etc.

Application device 202 is configured to discover and/or determine what content is stored to a split edge device 204 and/or an associated content cache 206. Any mechanism for discovery of content in the various split edge devices 204 may be used, such as a user directory generated by another entity, a directory or index generated by the application device 202 after connecting to the split edge devices 204, etc.

In one or more embodiments, system 200 may include more or fewer components than the components illustrated in FIG. 2. The components illustrated in FIG. 2 may be local to or remote from each other. The components illustrated in FIG. 2 may be implemented in hardware and/or software in various approaches. Operations described with respect to one component may instead be performed by another component.

In one or more embodiments, a data repository may be used to store information for system 200, and may be any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or may execute on the same computing system as system 200. Alternatively or additionally, a data repository may be implemented or executed on a computing system separate from system 200. Also, a data repository may be communicatively coupled to any device in system 200 for transmission and receipt of data via a direct connection or via a network.

2.3 Converged Edge Model for Content Delivery

Figure 3:
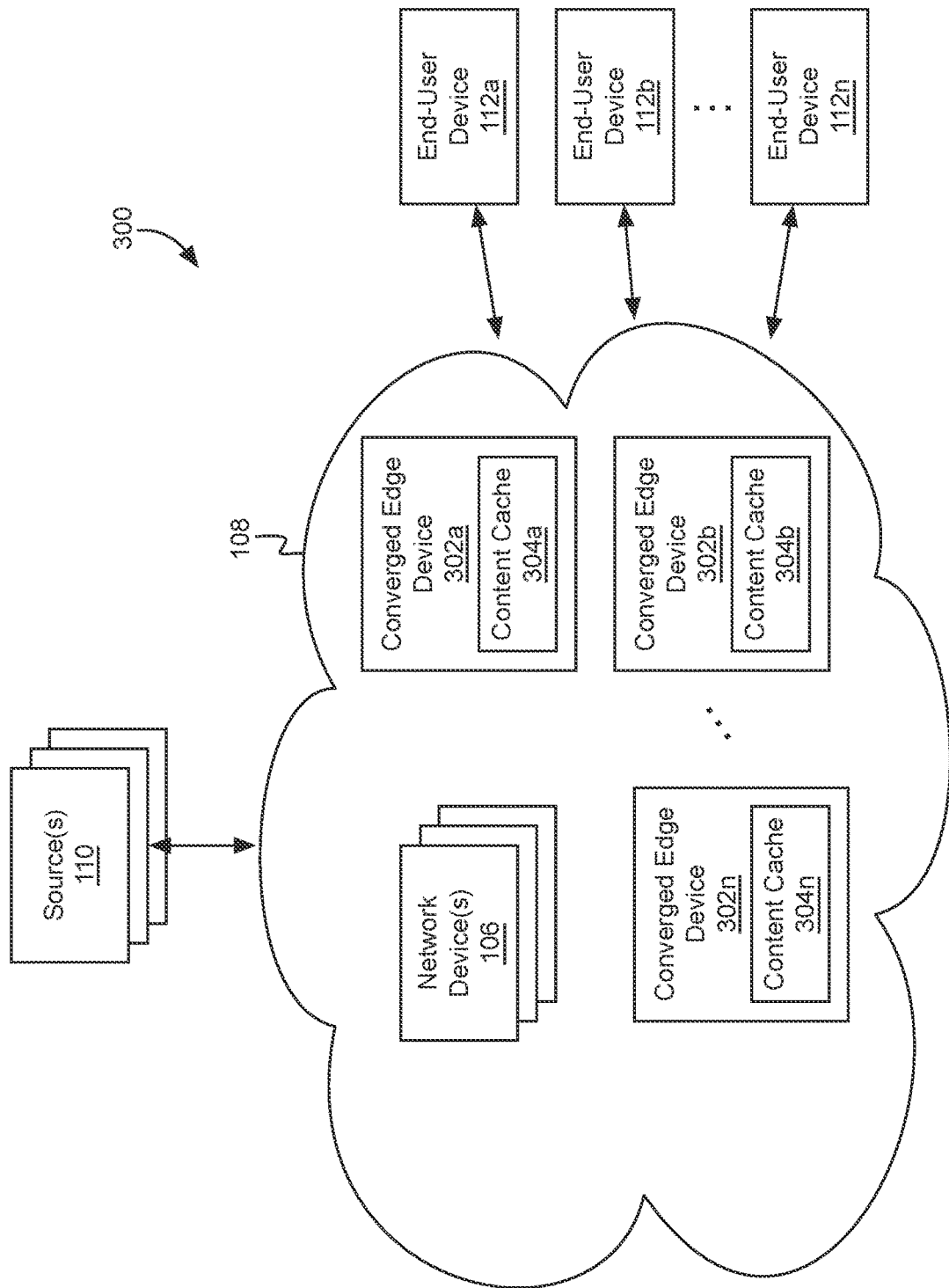
FIG. 3 illustrates an example system for content delivery in accordance with one or more embodiments.

FIG. 3 illustrates an example system 300 for providing content to end-user devices 112 using a converged edge model. System 300 includes a network 108, one or more sources 110 of content, and a plurality of end-user devices 112 (e.g., end-user device 112a, end-user device 112b, . . . , end-user device 112n) connected to network 108.

Network 108 includes various network devices 106, as described previously, and at least one converged edge device 302 (e.g., converged edge device 302a, converged edge device 302b, . . . , converged edge device 302n). In one embodiment, a plurality of converged edge devices 302 may be arranged in a cluster having multiple converged edge devices 302 intelligently grouped together for sharing workload therebetween. In this embodiment, as compared to system 100 of FIG. 1, the application-layer functionality and control may be distributed across multiple converged edge devices 302 and moved closer to the end-user devices 112.

These devices are referred to as "converged edge devices" because application-layer specific data which, in system 200 of FIG. 2 would be handled by a combination of application device 202 and split edge device 204, are instead handled by a "converged" device (e.g., a converged edge device 302) to conserve resources within network 108 by reducing an amount of data (e.g., content) that is transmitted through network 108 to deliver the content to end-user devices 112 connected to network 108. FIG. 3 illustrates a single network 108 and associated devices connected thereto, but this architecture may be duplicated many times over in an actual installation to serve an almost limitless number of end-user devices 112.

Each converged edge device 302 is also configured to handle management, processing, security, and policy decisions for the application-layer across network 108. Therefore, an application-layer request for content will be transmitted to a converged edge device 302 for processing, as other devices within network 108 will typically be unable to understand and/or process the application-layer request. Other application-layer related data may also be forwarded to converged edge devices 302 for processing in additional embodiments, instead of being handled by other network devices 106.

Each converged edge device 302 is in communication with a related content cache 304 (e.g., converged edge device 302a is in communication with content cache 304a, converged edge device 302b is in communication with content cache 304b, . . . , converged edge device 302n is in communication with content cache 304n).

Each converged edge device 302 is configured to receive and process application-layer content requests from end-user devices 112. A converged edge device 302 may retrieve content from source(s) 110 via network 108 in order to respond to the requests.

In a further embodiment, content caches 304 may be integrated with converged edge devices 302 (e.g., content cache 304a is integrated with converged edge device 302a and is only accessible to converged edge device 302a).

In one embodiment, content cache 304 may be treated as a universal cache for storing content therein, as directed by a lead converged edge device, thereby enabling the data stored in each content cache 304 to be known by the lead converged edge device and controlled by the lead converged edge device. The lead converged edge device may control what data is stored to the distributed content cache 304 by sending instructions to the individual converged edge devices 302. Each lead converged edge device 302 is configured to store content (and possibly other data, such as metadata, non-content information, etc.) to content cache 304 upon receiving the content, e.g., from source(s) 110 via network 108. Each converged edge device 302 is also configured to retrieve content from content cache 304, and deliver the retrieved content to one or more end-user devices 112, such as in response to an application-layer request for content sent by the one or more end-user devices 112 and processed by an associated converged edge device 302.

In one embodiment, at least one converged edge device 302 may include a command-aware hardware architecture which is configured to generate and/or execute command bundles, including command bundles sent from other converged edge devices. The command-aware hardware architecture may be implemented in a FPGA, ASIC, or some other hardware device that is able to efficiently process command bundles.

In one or more embodiments, system 300 may include more or fewer components than the components illustrated in FIG. 3. The components illustrated in FIG. 3 may be local to or remote from each other. The components illustrated in FIG. 3 may be implemented in hardware and/or software in various approaches. Operations described with respect to one component may instead be performed by another component.

In one or more embodiments, a data repository may be used to store information for system 300, and may be any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or may execute on the same computing system as system 300. Alternatively or additionally, a data repository may be implemented or executed on a computing system separate from system 300. Also, a data repository may be communicatively coupled to any device in system 300 for transmission and receipt of data via a direct connection or via a network.

According to various embodiments, components, devices, and/or functions described in any of FIGS. 1-3 may be combined together in existing and/or new installations. For example, a network may include one or more split edge devices, one or more converged edge devices, and/or an application cluster server in order to provide content delivery services to end-user devices.

3. EXAMPLE EMBODIMENTS

Detailed examples are described below for purposes of clarity. Components and/or operations described below should be understood as specific examples which may not be applicable to certain embodiments. Accordingly, components and/or operations described below should not be construed as limiting the scope of any of the claims.

3.1 Data Flow for an Initial Request for Content

Figure 4:
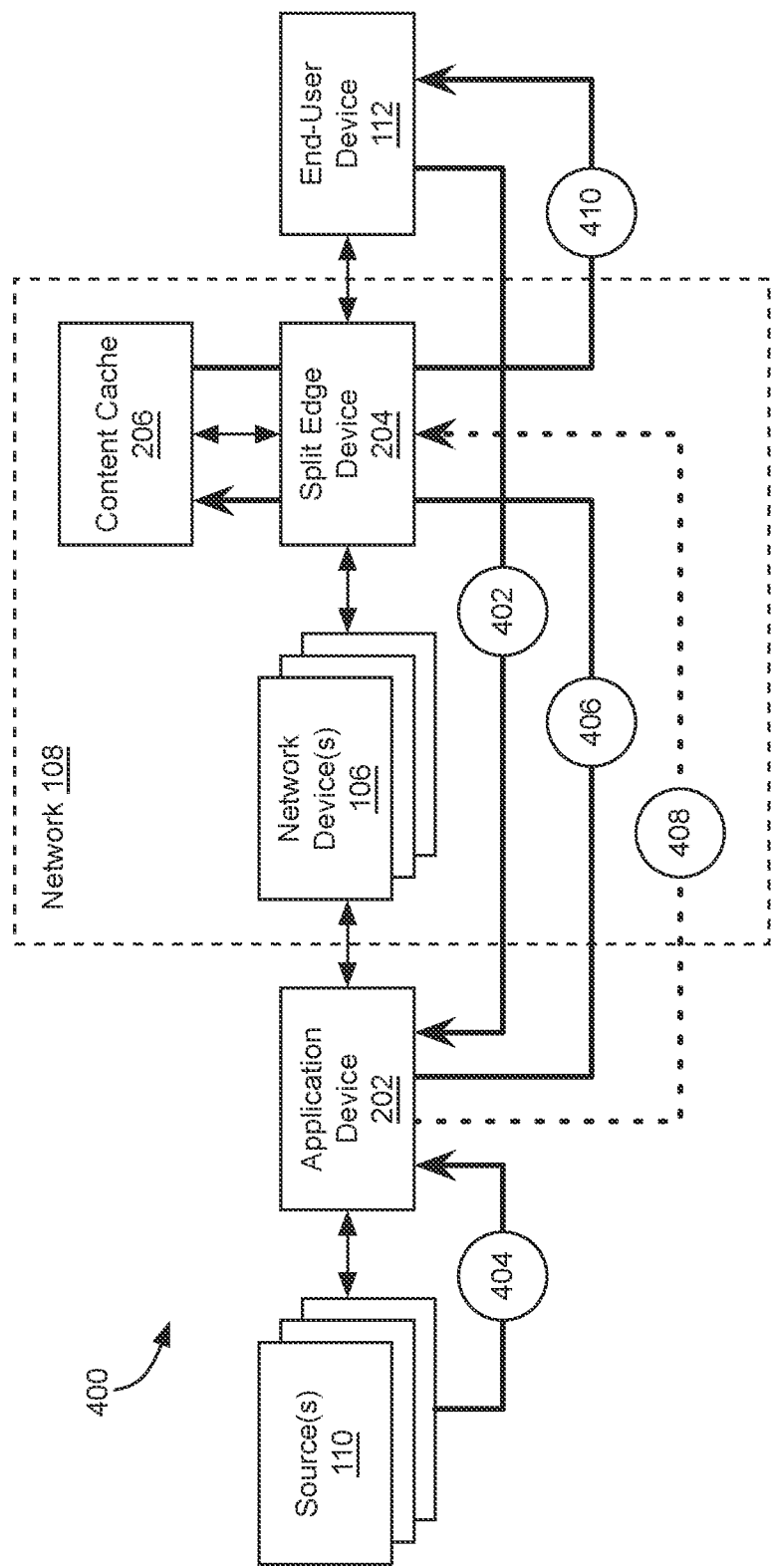
FIG. 4 illustrates an example data flow through a content delivery system in accordance with one or more embodiments.

FIG. 4 illustrates an example data flow 400 through a content delivery system in accordance with one or more embodiments. End-user device 112 generates and sends, in operation 402, an application-layer request for certain content. This application-layer request may be an initial or first request for particular content, or a request for the particular content that is sent after a certain amount of time has passed since a last time that the particular content has been requested by one or more end-user devices 112 through network 108. In either of these situations, the content will not be stored in content cache 206 of split edge device 204, and therefore will be provided by application device 202.

The request is sent through network 108, such as via split edge device 204 and various network devices 106, arriving at application device 202 which is configured to process application-layer requests. Application device 202 acquires, in operation 404, the content requested by the application-layer content request from a source 110 (which may include a content cache of application device 202 in one embodiment).

In operation 406, application device 202 sends the content to split edge device 204 which stores the content in content cache 206. In addition, application device 202, in operation 408, sends instructions to split edge device 204. Operation 408 may include more than one set of instructions being sent from application device 202 to at least one split edge device 204.

One set of instructions sent in operation 408 may indicate, at least, reference to a location to store the content in content cache 206, such that application device 202 will have visibility as to what content is stored to content cache 206 and where it is stored. The reference may be to an absolute address, relative address, physical address, logical address, a pointer, or some other indication of where the content should be placed within the content cache 206, or some other memory accessible to split edge device 204. The reference may rely on a mapping of the content cache that is available to one or more split edge devices 204 and the application device 202, so that full memory addresses do not need to be sent, but instead some shorter reference may be included in the set of instructions to conserve resources but not reduce accuracy of content storage.

Split edge device 204 executes the storage and retrieval of content to and from content cache 206, but application device 202 provides instructions on where to store the content, when to retrieve it, etc.

A further set of instructions that may be sent in operation 408 may direct split edge device 204 to retrieve and deliver specific content from content cache 206 to one or more particular end-user devices 112. In order to respond to this further set of instructions, in operation 410, split edge device 204 retrieves the content from content cache 206 and delivers it to the particular end-user device(s) 112. The further set of instructions may be sent in response to the application-layer request issued by one or more end-user devices 112.

In one embodiment, the content may be sent by the application device 202 to the split edge device 204 as instructions or included within further instructions on where to store the content.

Operations 404, 406, 408, and 410 of data flow 400 may be used without receiving an application-layer request for the particular content, such as in response to some other triggering condition being satisfied. Some example triggering conditions include, but are not limited to, recognizing conditions that indicate imminent use of the certain content by end-user device 112 (such that the certain content can be pre-populated in content cache 206), time and/or location-specific conditions being satisfied, etc.

The data flow 400 may further include encapsulation operations, compression operations, encryption operations, or any other packet or message modification techniques that enable more secure, more efficient, and/or more reliable transmissions of data through network 108, in various approaches.

3.2 Data Flow for Subsequent Requests for Content

Figure 5:
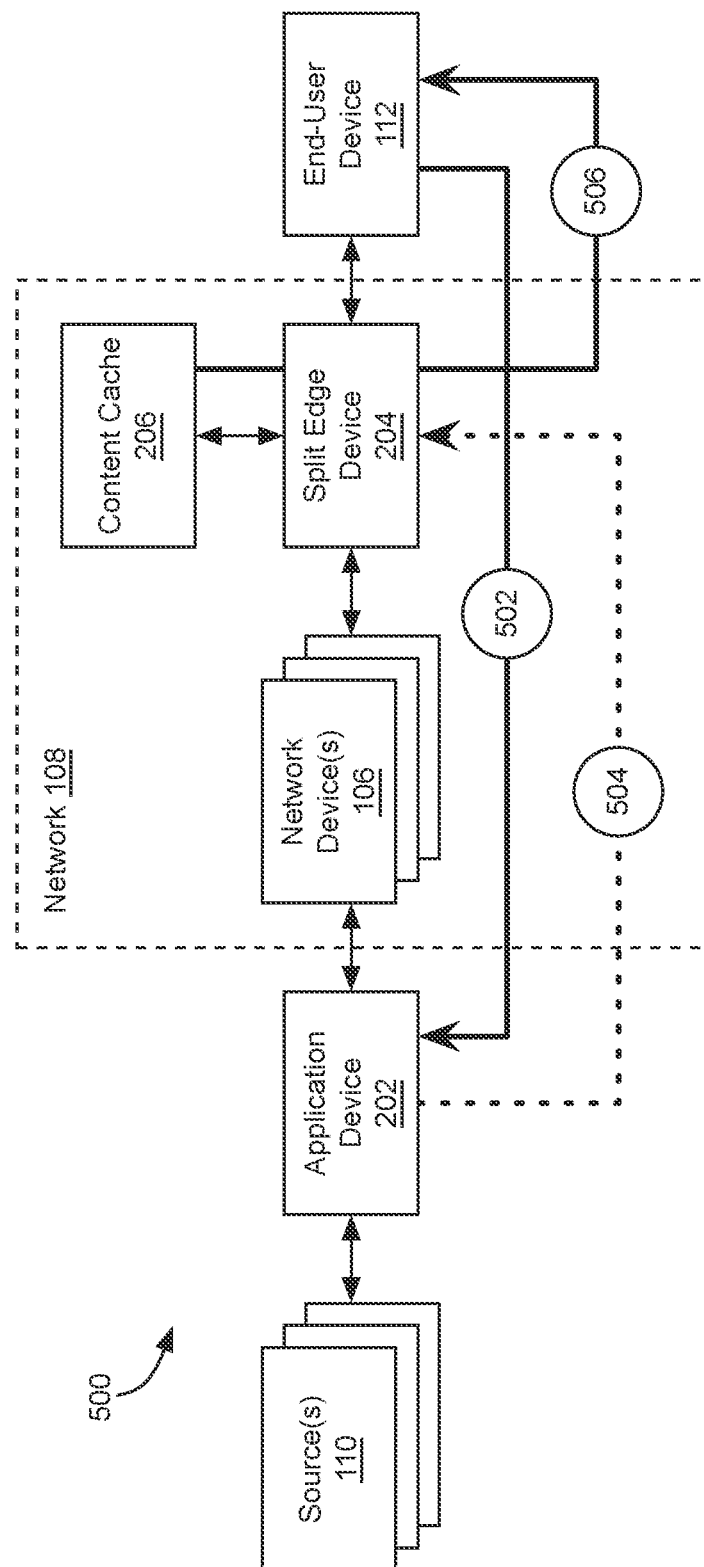
FIG. 5 illustrates an example data flow through a content delivery system in accordance with one or more embodiments.

FIG. 5 illustrates an example data flow 500 through a content delivery system in accordance with one or more embodiments. An end-user device 112 generates and sends, in operation 502, an application-layer request for certain content that has been previously requested by an end-user device within a predetermined time period, and is therefore still stored in content cache 206 of a split edge device 204. In other words, application device 202 can determine whether the certain content is still stored t content cache 206 (and has not been evicted, removed, written over, or otherwise unreadable).

The request is sent through network 108 arriving at application device 202 which is configured to process application-layer requests. In one approach, the request may be sent via split edge device 204 and/or other various network devices 106, but is not necessary for the operation to take place, and may travel through other devices and/or networks. In operation 504, application device 202 sends instructions to split edge device 204. The instructions indicate, at least, reference to a location to retrieve the content in content cache 206.

The application device 202 may have knowledge of the certain content being stored due to it previously instructing split edge device 204 to store the content, based on information shared by split edge device 204 when it stored the content in content cache 206, or obtained in some other manner. Moreover, the application device 202 may not know an exact location of where the certain content is stored, but may instead simply instruct the split edge device 204 to store the certain content, and then know that it is stored and available to the split edge device 204. Split edge device 204, in order to respond to the application-layer request issued by end-user device 112, retrieves the content from content cache 206 and delivers it to end-user device 112.

Operations 504 and 506 of data flow 500 may be used without receiving an application-layer request for the certain content, such as in response to some other triggering condition being satisfied. Some example triggering conditions include, but are not limited to, recognizing conditions that indicate imminent use of the certain content by end-user device 112 (such that the certain content can be pre-populated in content cache 206), time and/or location-specific conditions being satisfied, etc.

The data flow 500 may further include encapsulation/decapsulation operations, compression/expansion operations, encryption/decryption operations, or any other packet or message modification techniques that enable more secure, more efficient, and/or more reliable transmissions of data through network 108, in various approaches.

In one approach, application device 202 may determine whether to perform one or more actions at split edge device 204 which is connected to at least one end-user device 112. In this approach, split edge device 204 is configured to manage traffic sent to and received from the at least one end-user device 112, and receive instructions from application device 202. This determination may be performed in response to receiving an application-layer request in operation 502, or based on some other triggering condition. In operation 504, application device 202 sends instructions to split edge device 204 for performing the one or more actions on data received from the at least one end-user device 112.

The one or more actions may be applied to a certain type, some, or all requests, messages, data, etc. (hereafter "packets") from a specified, some, or all end-user devices 112 connected through split edge device 204 and/or directed to one, some, or all destination devices. The one or more actions may include, but are not limited to, compressing packets or a portion thereof; uncompressing packets or a portion thereof; encrypting packets or a portion thereof; decrypting packets or a portion thereof; filtering packets; discarding packets; quarantining packets; routing packets; switching packets; etc.

3.3 Example Packets for Content Delivery

Figure 6:
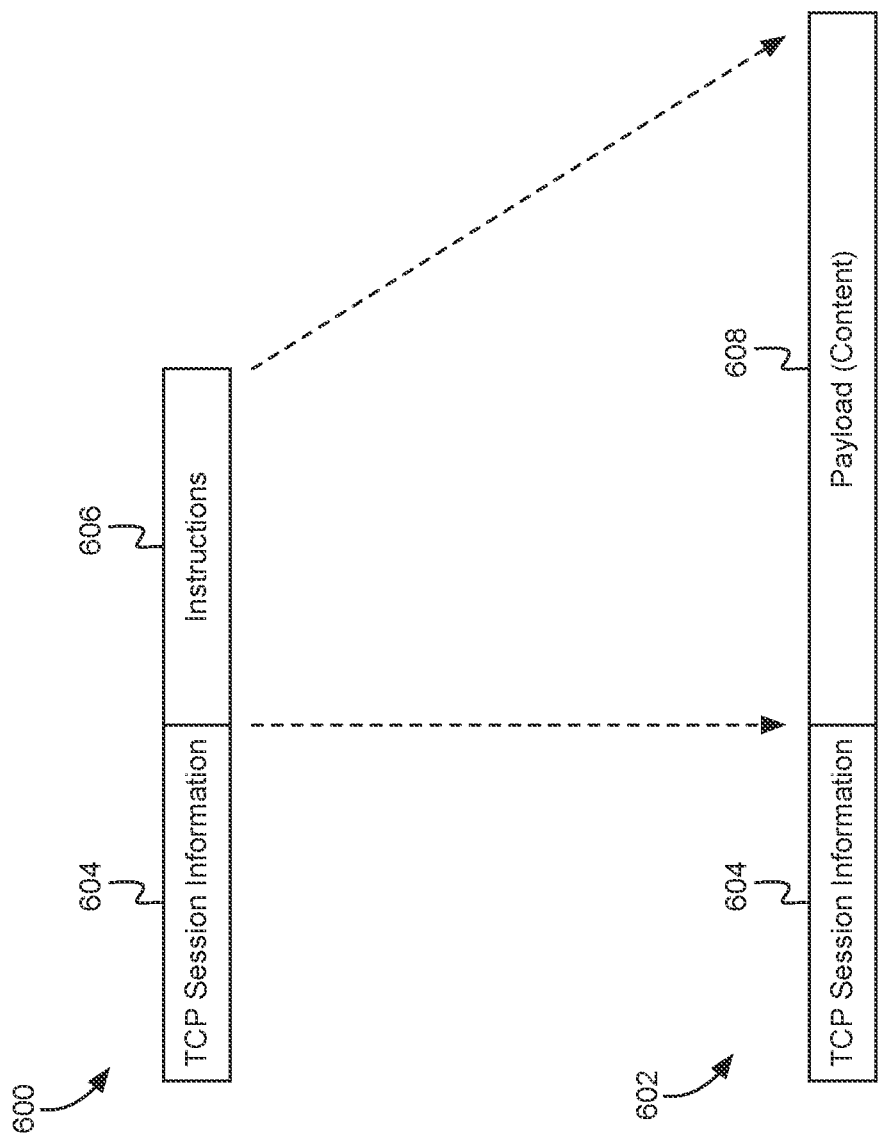
FIG. 6 shows example packet formats for use in delivering content to end-user devices.

FIG. 6 shows example packets for use in delivering content to end-user devices. Packet 600 may be generated and/or used by an application device for transmitting instructions (which may include reference to a location) for specified content to a split edge device. Packet 602 may be generated and/or used by an application device for transmitting content 608 to a split edge device. In one embodiment, the instructions 606 may include reference to a storage location within a content cache, and command the split edge device to store content to the specified location within the content cache associated with the split edge device. In another embodiment, the instructions 606 may include reference to a storage location within a content cache associated with a split edge device, and provide a command to the split edge device to retrieve content stored to the specified location within the content cache, such as to deliver to another device.

In one or more approaches, the instructions 606 may dictate application of one or more policies, actions, and/or filters at a split edge device. For example, instructions 606 may command split edge device to filter packets and/or requests from one or more specified end-user devices. The packets may be discarded, quarantined, and/or analyzed as a result of the filtering policy, such as for security purposes. In another example, instructions 606 may command a split edge device to route packets and/or requests from one or more specified end-user devices to a specified device in a network. In yet another example, instructions 606 may provide communication information for use by a split edge device in switching and/or routing packets.

In one approach, the instructions 606 may describe a distributed denial-of-service (DDoS) attack and/or actions for a split edge device to perform in order to alleviate this attack, such as dropping packets, filtering queries and requests, etc., from one or more indicated end-user devices and/or from other split edge devices.

According to one example, content 608 may be provided to a split edge device as plaintext. However, instructions 606 provided in conjunction with the content 608 may dictate that the split edge device perform some actions and/or functions prior to transmitting the content 608 to an end-user device. These actions and/or functions may be customized per end-user device and/or set globally across all end-user devices serviced by a particular split edge device. In one example, the split edge device may be instructed to encrypt and/or compress the content 608 prior to transmitting the content 608 to the end-user device, such as in systems which utilize encrypted application responses, e.g., HTTPS. Other actions or functions may also be dictated by the instructions 606 for the split edge device to perform prior to transmitting the content to the end-user device, such as traffic management, packet dropping, etc.

In a further example, the instructions 606 may provide information, context, and/or metadata to the split edge device to decide what function(s) to perform, which packets to perform the function(s) on, when to perform the function(s), and associated information for performance of the function(s), such as one or more encryption keys for encryption/decryption, an algorithm or format for compression, etc.

In one embodiment, packet 600 may be used as a protocol data unit (PDU) for relaying user information between devices. Packet 600 includes TCP session information 604. In an approach, TCP session information 604 may include one or more headers, such as a TCP header, an IP header, etc. The TCP session information 604 may provide information needed to transmit data from an application device to a split edge device through a network and any intermediate devices therebetween. Because this packet 600 is configured to include instructions and not actual content itself, the size of each packet 600 is smaller than a corresponding packet 602, even when used to relay access to the same content.

Content 608 is inserted as a payload of packet 602 for use in transmitting content to a split edge device by an application device. As shown, a size of each packet 602 is substantially larger than a corresponding packet 600, because packet 600 includes instructions 606 indicating reference to a storage location for specified content, while packet 602 includes the actual content 608 itself.

In one approach, an application device may send one or more packets 602 having content 608 and one or more packets 600 having instructions 606 indicating where to store the content 608 in a content cache associated with a split edge device. In this way, the application device has knowledge of where content is stored in content cache of the split edge device, which may be used later when another end-user device requests the same content.

3.4 Method for Providing Content Using an Application Device

Figure 7:
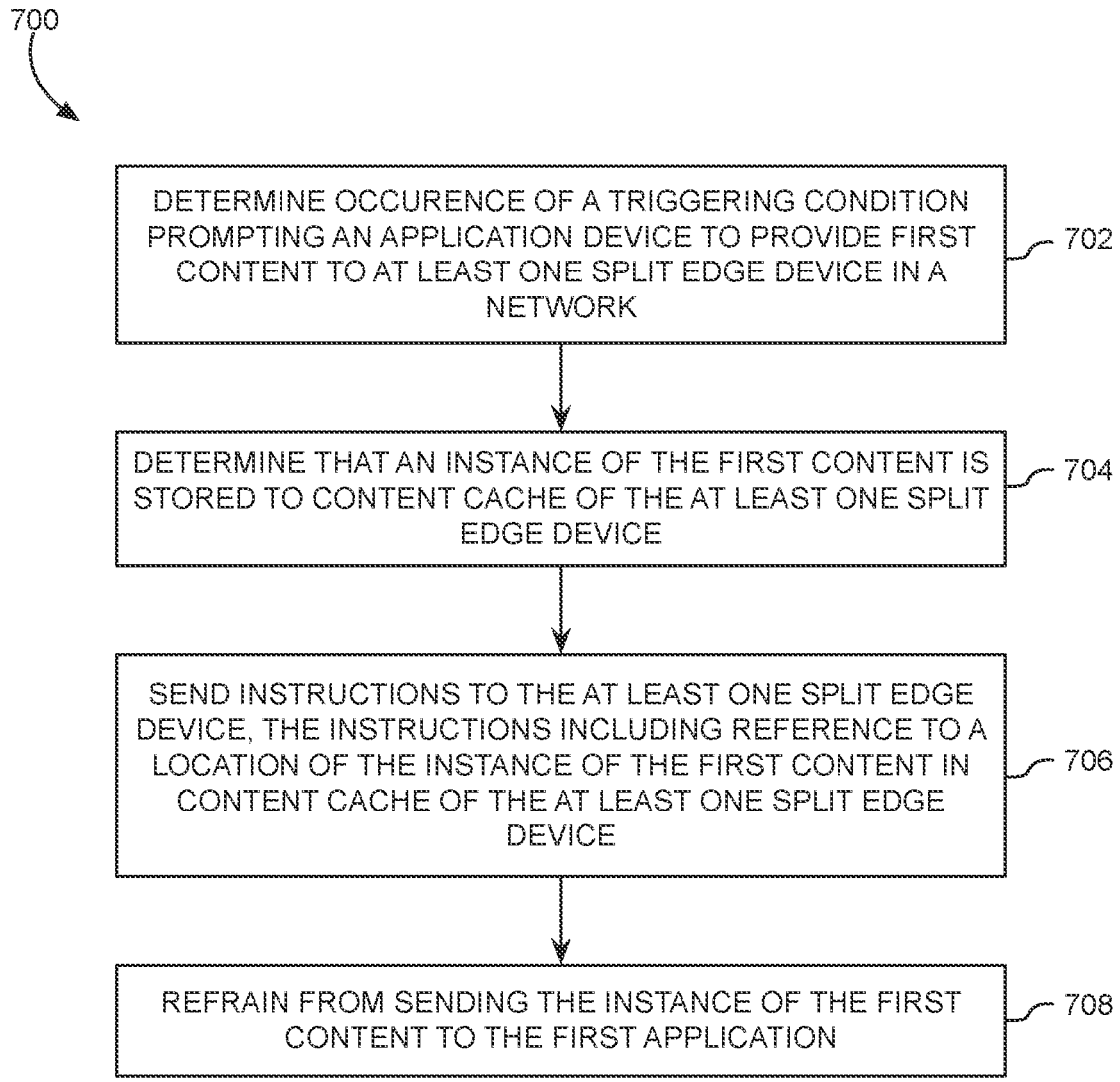
FIG. 7 is a flow diagram of an example method for providing content in a distributed split edge application architecture.

FIG. 7 is a flow diagram of an example method 700 for providing content in a distributed split edge application architecture in accordance with one or more embodiments. One or more operations illustrated in FIG. 7 may be modified, rearranged, or omitted all together. Accordingly, the particular sequence of operations illustrated in FIG. 7 should not be construed as limiting the scope of one or more embodiments. In one embodiment, an application device of a distributed split edge application architecture may perform method 700 to provide content for one or more end-user devices. In other embodiments, method 700 may be performed by software and/or a hardware device in the network. For the remainder of the descriptions of FIG. 7, method 700 will be described from the perspective of an application device.

In operation 702, the application device determines or detects occurrence of a triggering condition. The application device may be configured with a set of triggering conditions, logic, and/or intelligence describing circumstances in which particular content should be transmitted to certain split edge devices, for provision to one or more end-user devices. One example triggering condition includes actions that signal imminent use of the particular content by an end-user device to allow for the particular content to be pre-populated in content cache for more efficient delivery to the end-user device. Another example triggering condition includes a certain time, day, day of the week, day of the month, occurrence of a periodic time, expiration of a timer, or some other time/date related condition. These types of triggering conditions may be useful for predicting, based on past usage data, when an end-user device will demand the particular content. Yet another example triggering condition includes location-specific conditions being satisfied, such as a device being in a predetermined location, arrival or departure from a certain location, travel between locations, etc.

The triggering condition prompts the application device to provide a first content, accessible to the application device, to at least one split edge device in a network. In this embodiment, the split edge device (and possibly more than one split edge device) is configured to deliver the first content to a first application operating on a first end-user device.

In operation 704, the application device determines whether an instance of the first content is stored to content cache of the at least one split edge device. In one embodiment, this determination may be based on previously instructing one or more split edge devices to store the content to its content cache, which may include a reference to a particular location for where to store the content. In another approach, a split edge device may report to the application device existence of the content in content cache and/or a location where the content is stored, e.g., in content cache. This report may be issued responsive to storing the content in one approach.

In another embodiment, application device may determine how long content will be stored in content cache for one or more split edge devices based on an eviction policy.

In operation 706, responsive to determining that the instance of the first content is stored to content cache of the at least one split edge device, the application device sends, via the network, instructions to the at least one split edge device. The instructions may serve multiple purposes.

In one example, the instructions include reference to a location of the instance of the first content in content cache of the at least one split edge device. This information may be known by the application device based on previously instructing the split edge device about where to store the content, by receiving confirmation of where the content is stored, by polling split edge devices regarding their content cache data, etc.

In an example, the instructions indicate that the instance of the first content is stored local to the at least one split edge device, e.g., in content cache thereof. The at least one split edge device will then determine where the content is stored in order to retrieve it.

In an example, the instructions instruct and/or dictate to the at least one split edge device to send the instance of the first content to the first application, once it is retrieved from content cache or whichever local storage area it is stored on a particular split edge device.

In operation 708, the application device refrains from sending the instance of the first content to the first application. This conserves resources in the network and devices therein for other processing activities and content delivery functions.

3.5 Method for Providing Content Using an Application Device

Figure 8:
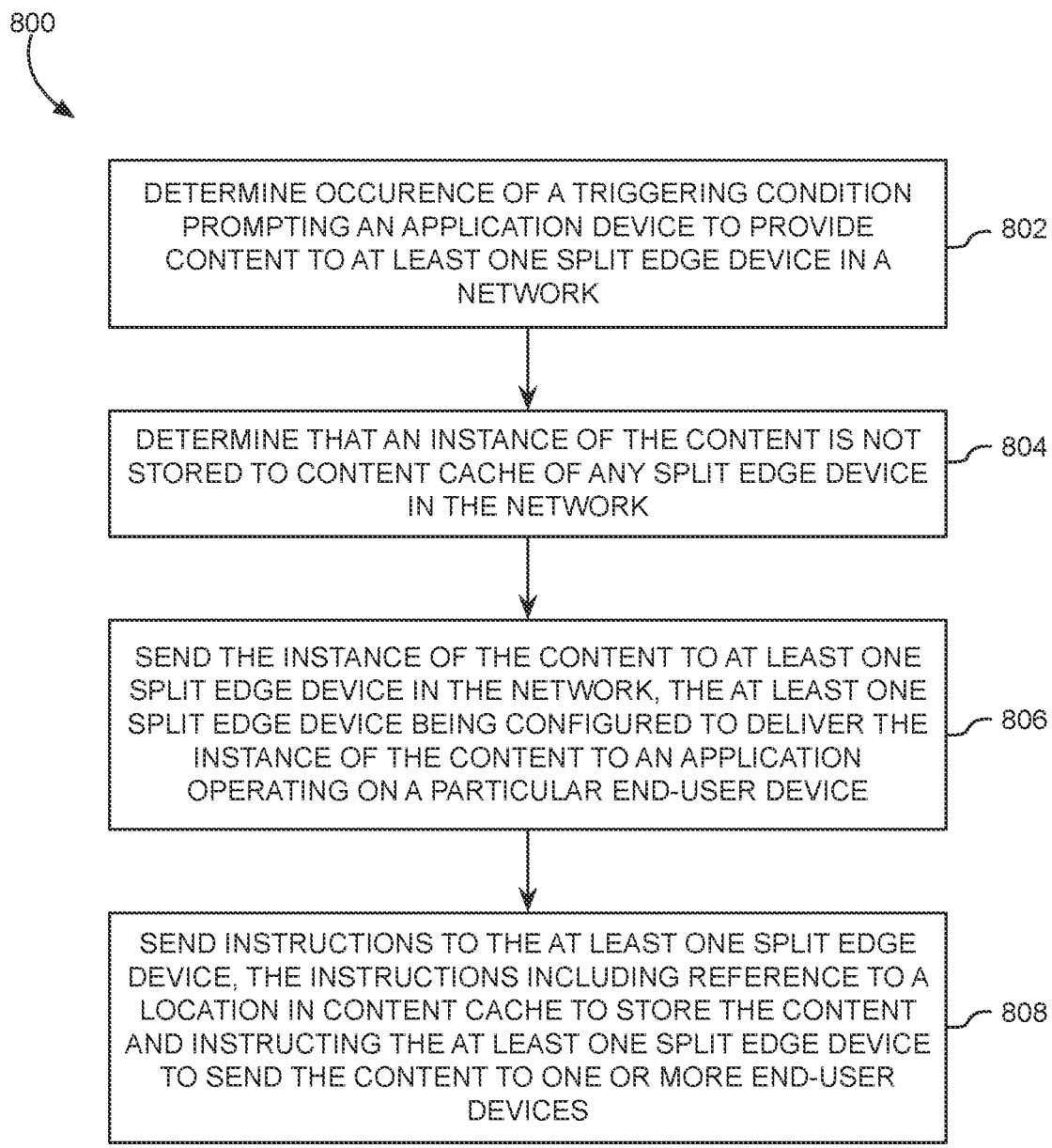
FIG. 8 is a flow diagram of an example method for providing content in a distributed split edge application architecture.

FIG. 8 is a flow diagram of an example method for providing content in a distributed split edge application architecture in accordance with one or more embodiments. One or more operations illustrated in FIG. 8 may be modified, rearranged, or omitted all together. Accordingly, the particular sequence of operations illustrated in FIG. 8 should not be construed as limiting the scope of one or more embodiments. In one embodiment, an application device of a distributed split edge application architecture may perform method 800 to provide content for one or more end-user devices. In other embodiments, method 800 may be performed by software and/or a hardware device in the network. For the remainder of the descriptions of FIG. 8, method 800 will be described from the perspective of an application device.

In operation 802, the application device determines occurrence of a triggering condition. Any set of triggering conditions may be used, as described previously with respect to FIG. 7, or as would be understood by one of skill in the art. Detection of the triggering condition prompts the application device to provide content, accessible to the application device, to the at least one split edge device. As discussed, the at least one split edge device is configured to deliver the content to an application operating on a particular end-user device, in response to the triggering condition.

In operation 804, the application device determines whether an instance of the content is stored to content cache of a split edge device in the network. This determination may be based on whether the application device has previously instructed the at least one split edge device to store the content to its content cache.

In operation 806, responsive to determining that the instance of the content is not stored to content cache of any split edge device in the network, the application device sends the instance of the content to the at least one split edge device. In one embodiment, this instance of the content may be sent to the at least one split edge device as instructions, in association with instructions, or separate from any instructions along a data plane of the network.

In operation 808, which may sent in conjunction with and/or as a part of the instructions sent in operation 806 in several approaches, the application device sends instructions to the at least one split edge device instructing the at least one split edge device to deliver the content to one or more end-user devices. These instructions may further include reference to a location where the content is stored in content cache, if such information is known to the application device.

In one embodiment, packets that include the content may be modified in some way prior to being delivered to the split edge device, such as through encryption, compression, etc. Once the packets arrive at the split edge device, they may be reverted back to their original state, e.g., uncompressed, decrypted, etc. Moreover, the split edge device may perform one or more actions of the content and/or a portion thereof prior to sending the content to According to one or more embodiments, the instance of the content may be sent by the application device to a plurality of split edge devices in the network. In this embodiment, the application device may send and/or deliver instructions to store the instance of the content to content cache local to each split edge device of the plurality of split edge devices in the network. The instructions may include reference to the particular location. In this way, the application device may manage the content caches of each split edge device and have knowledge of what data is stored and where it is stored in each content cache.

According to one embodiment, the plurality of split edge devices in the network may be in communication via a message bus or utilize some other communication channel which allows for the instructions to be sent out once, and arrive at each split edge device. One such communication channel may include broadcasting the instructions to all split edge devices.

In a further embodiment, each split edge device in the network may be separately configured to deliver the instance of the content from local content cache to one or more end-user devices connected to respective split edge devices responsive to the instructions.

According to one embodiment, the application device may receive a plurality of application-layer requests for the first content from a plurality of end-user devices. In other words, the content is popular among end-user devices, and many end-user devices have requested the first content simultaneously or concurrent with one another. This is possible with live streaming content (like sporting events, first run television shows, video game downloads/updates, etc.) and results in high demand across the network. To address the plurality of application-layer requests for the content, the application device sends second instructions to the at least one split edge device in addition to the first instructions. The second instructions indicate that the instance of the content is stored in the content cache (and may include the location or a reference to the location), and may further instruct the at least one split edge device to deliver the instance of the content to each of the plurality of end-user devices which are connected to the at least one split edge device.

Moreover, in a further embodiment, when particular end-user device(s) which request the content are not connected to the at least one split edge device, the second instructions are sent to one or more other split edge devices to which the particular end-user device(s) are connected in order to deliver the content to the particular end-user device(s).

In one embodiment, the application device may instruct the at least one split edge device to apply one or more policies for managing data at the split edge device. For example, the instructions may dictate at least one filtering policy, when and what type of packets to drop, at least one security policy, at least one eviction policy for removing content from the local content cache of the at least one split edge device based on an amount of time having passed since a last request for the first content was received, etc.

3.6 Method for Providing Content Using a Split Edge Device

Figure 9:
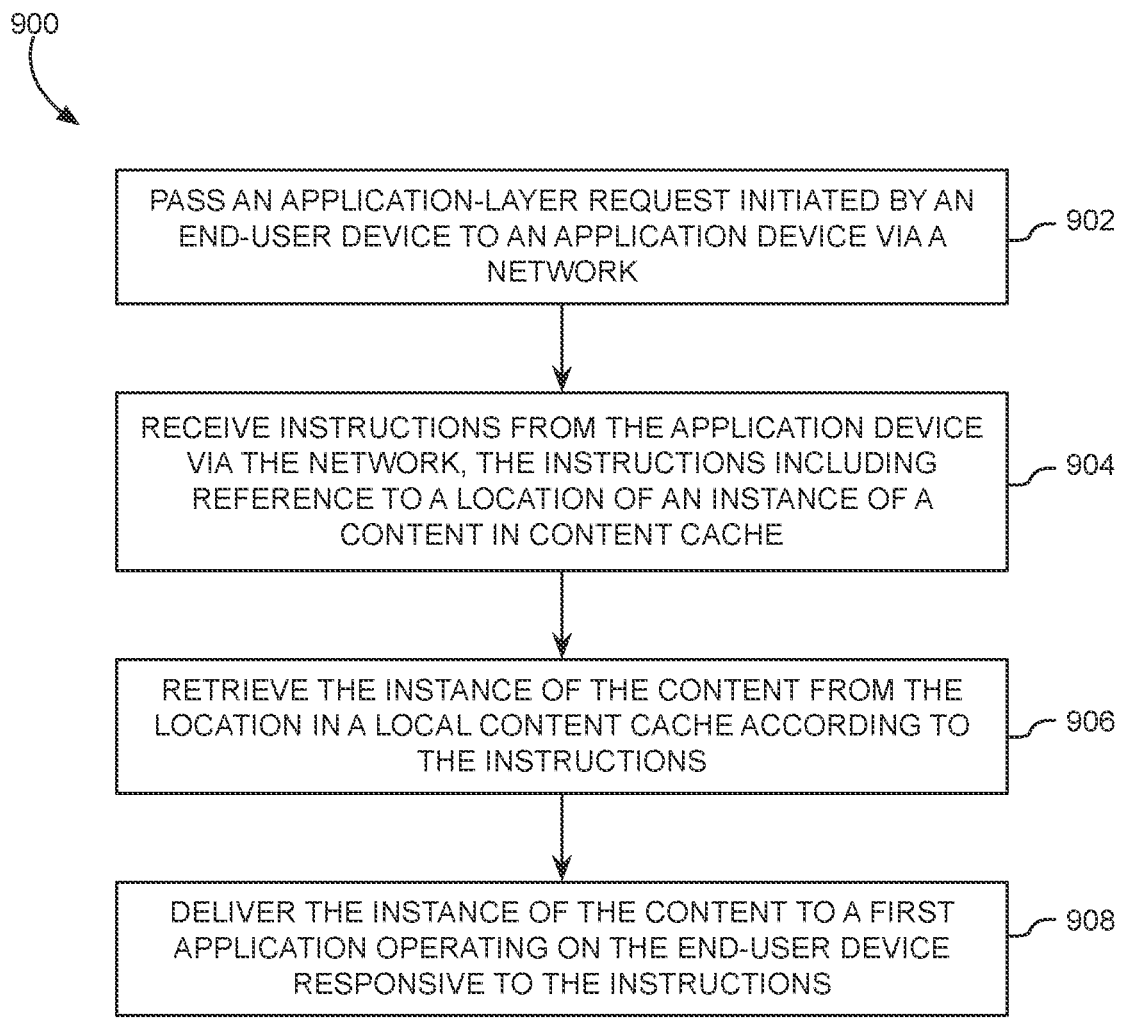
FIG. 9 is a flow diagram of an example method for providing content in a distributed split edge application architecture.

FIG. 9 is a flow diagram of an example method for providing content in a distributed split edge application architecture. One or more operations illustrated in FIG. 9 may be modified, rearranged, or omitted all together. Accordingly, the particular sequence of operations illustrated in FIG. 9 should not be construed as limiting the scope of one or more embodiments. In one embodiment, a split edge device of a distributed split edge application architecture may perform method 900 to provide content for one or more end-user devices. In other embodiments, method 900 may be performed by software and/or a hardware device in the network. For the remainder of the descriptions of FIG. 9, method 900 will be described from the perspective of a split edge device.

In operation 902, a split edge device passes an application-layer request (e.g., a request for content) to an application device. The split edge device merely acts as a pass-through for this request, because as an application-layer request, it is not typically able to be processed and/or handled by the split edge device. The application-layer request for content may be initiated by an end-user device in communication with the split edge device, e.g., directly connected, connected via a network, a router, a switch, etc., or it may be generated by some other device in or out of the network.

In one embodiment, the split edge device may be a member of a distributed network of split edge devices that work together as a collective whole. This distributed network may be referred to as a cluster in one approach.

In another embodiment, the split edge device may be integrated with a network device in the network. For example, the split edge device may be integrated with a router, a switch, a server, or some other type of network device. According to another embodiment, the split edge device may be integrated in another component of the network or outside of the network which is located in a communication path between the application device and the end-user device.

In operation 904, responsive to the application-layer request, the split edge device receives instructions from the application device. The instructions include reference to the location of the instance of the content in a local content cache, and may further instruct the split edge device to send the instance of the content to a particular end-user device, to a particular application operating on the end-user device, or to some other destination based on the request. In one embodiment, the instructions may not recite a location for the content, but may instead simply indicate that the content is stored locally to the split edge device.

In one embodiment, one or more packets that include the instructions may be encapsulated in at least one overlay packet by a tunnel device in the network prior to being delivered to the particular split edge device. A tunnel device may be a router, server, or some other network device capable of tunnel termination and initiation within the network. In one embodiment, the application device may comprise a tunnel device and/or functionality of a tunnel device for encapsulating and decapsulating packets and overlay packets. Each overlay packet includes an overlay header. Any suitable overlay and/or tunneling method and/or protocol may be used for the overlay packet(s), such as virtual extensible local area network (VXLAN), IP Security (IPSec), general packet radio service (GPRS) tunneling protocol (GTP), etc.

In this embodiment, the split edge device may intercept the overlay packet(s) and de-capsulate the overlay packet(s) to obtain the instructions. The split edge device may determine whether to intercept an overlay packet based on information included in the overlay header, such as an origination device, a destination device, a flag or marker, etc.

In operation 906, the split edge device retrieves the instance of the content from the location in the local content cache of the split edge device according to the instructions. The local content cache is accessible to the split edge device (and possibly not accessible to any other device in the network), such as by being integrated with a device which comprises the split edge device.

In operation 908, the split edge device delivers and/or sends the instance of the content to a particular end-user device, to a particular application operating on the end-user device, or to some other destination based on the request and in accordance with the received instructions.

According to one embodiment, the application device may dictate a data collection policy on one or more split edge devices in the network. In response to initiating such a data collection policy a split edge device may determine an amount of data transmitted to each end-user device connected to the particular split edge device over a predetermined period of time. The period of time may be dictated by the data collection policy or may be a default value that is a rolling window of time. In addition, the particular split edge device may transmit the amount of data to another device (e.g., the application device, a data collection device, a server, a router, a switch, etc.) for tracking data use by end-user device(s) in communication with the particular split edge device. One or more specified end-user devices may have data tracked in one approach, or all end-user device data consumption may be tracked in another approach. The transmission of the data may occur after conclusion of a collection window specified in the policy, periodically, at a conclusion of particular content item, etc.

3.7 Method for Providing Content Using a Split Edge Device

Figure 10:
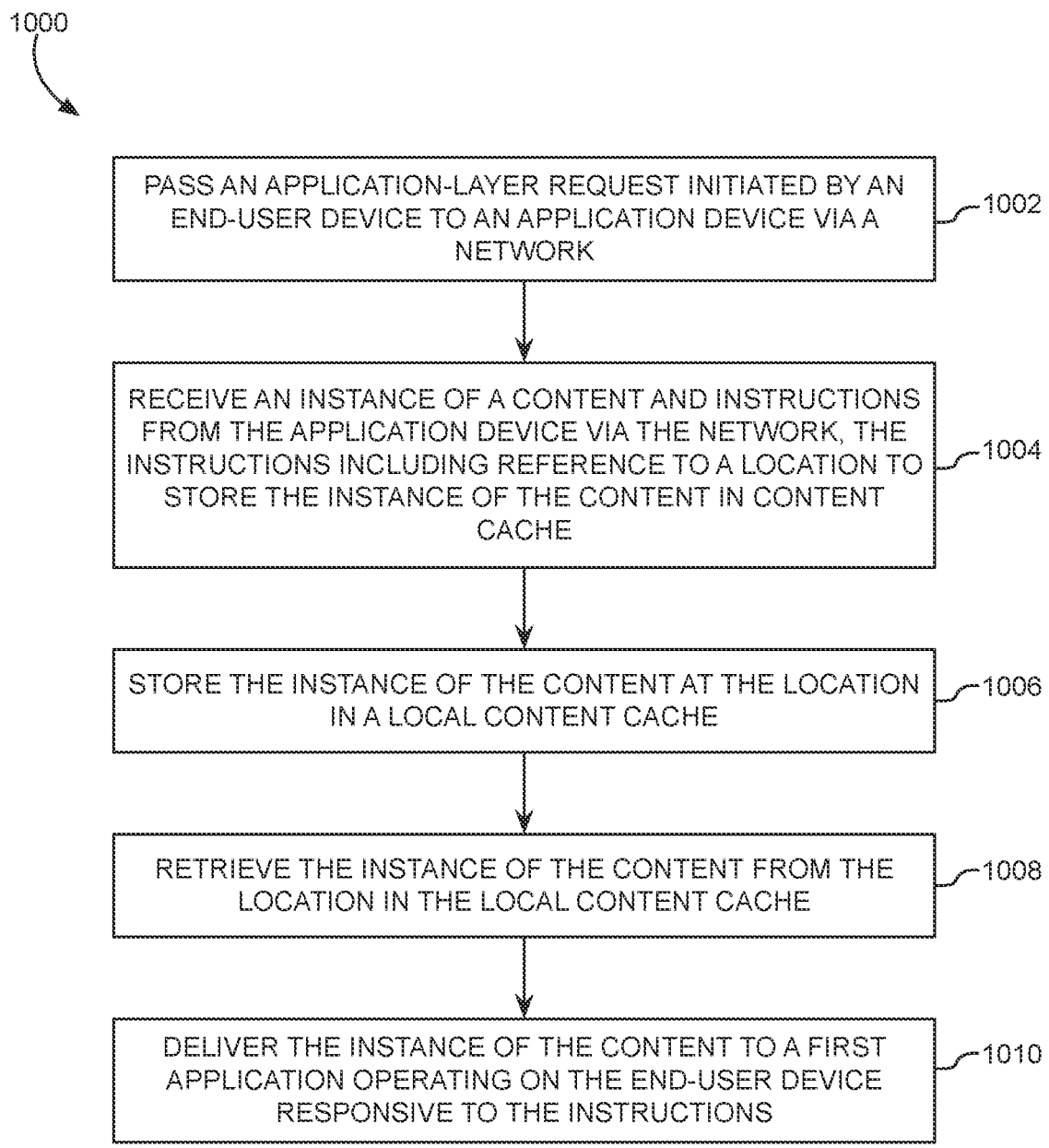
FIG. 10 is a flow diagram of an example method for providing content in a distributed split edge application architecture.

FIG. 10 is a flow diagram of an example method 1000 for providing content in a distributed split edge application architecture. One or more operations illustrated in FIG. 10 may be modified, rearranged, or omitted all together. Accordingly, the particular sequence of operations illustrated in FIG. 10 should not be construed as limiting the scope of one or more embodiments. In one embodiment, a split edge device of a distributed split edge application architecture may perform method 1000 to provide content for one or more end-user devices. In other embodiments, method 1000 may be performed by software and/or a hardware device in the network. For the remainder of the descriptions of FIG. 10, method 1000 will be described from the perspective of a split edge device.

In operation 1002, a split edge device passes an application-layer request (e.g., a request for content) to an application device via a network that includes a number of network devices. The split edge device merely acts as a pass-through for this request, because as an application-layer request, it is not typically able to be processed and/or handled by the split edge device. The application-layer request for content may be initiated by an end-user device in communication with the split edge device, e.g., directly connected, connected via a network, a router, a switch, etc., or it may be generated by some other device in or out of the network.

In one embodiment, the split edge device may be a member of a distributed network of split edge devices that work together as a collective whole. This distributed network may be referred to as a cluster in one approach.

In another embodiment, the split edge device may be integrated with a network device in the network. For example, the split edge device ay be integrated with a router, switch, a server, or some other type of network device. According to another embodiment, the split edge device may be integrated in another component of the network which is located between the application device and the end-user device.

In operation 1004, responsive to the application-layer request, the split edge device receives an instance of the requested content from the application device. In one embodiment, the instance of the content may be received in instructions, which may refer to a location in content cache of the split edge device to store the instance of the content. The instructions, or subsequent instructions, may instruct the split edge device to deliver the instance of the content to a first application operating on a first end-user device (e.g., which sent the request initially for the content).

In one embodiment, one or more packets that include the instructions and/or the content may be encapsulated in at least one overlay packet by a tunnel device in the network prior to being delivered to the particular split edge device. A tunnel device may be a router, server, or some other network device capable of tunnel termination and initiation within the network. Each overlay packet includes an overlay header. In this embodiment, the split edge device may intercept the overlay packet(s) and de-capsulate the overlay packet(s) to obtain the content and the instructions. The split edge device may determine whether to intercept an overlay packet based on information included in the overlay header, such as origination device or destination device.

In one embodiment, one or more packets comprising the instance of the content may be encapsulated in at least one overlay packet, such as by a tunnel device in the network prior to being delivered to the at least one split edge device. Each overlay packet includes an overlay header which specifies an initiation device and a destination device for the tunnel. In this embodiment, the at least one split edge device may be configured to intercept and de-capsulate the overlay packet(s) to obtain the instance of the content. In a further embodiment, instructions may be included in the overlay packet(s), which may also be obtained by the de-capsulation process for instructing the at least one split edge device on how to manage, store, and process the instance of the content.

In operation 1006, the split edge device stores the received instance of the content, e.g., at the specified location in a local content cache of the split edge device when such information is provided. Otherwise, the split edge device chooses where to store the content. Reference to the specified location may be included in instructions sent by the application device, and the reference may be analyzed and/or processed by the split edge device to determine the actual location to store the received instance of the content. This reference may also be sent in instructions to one or more other split edge devices to store the same content in the same location within each of the split edge device's local content cache.

In operation 1008, the split edge device retrieves the instance of the content from the location in the local content cache of the split edge device according to the instructions. The instructions are able to accurately convey the location of the content due to the split edge device being instructed, previously, regarding where to store the content when storing it to content cache.

In operation 1010, the split edge device delivers and/or sends the instance of the content to a particular end-user device, to a particular application operating on the end-user device, or to some other destination based on the request.

According to one embodiment, packets that include the instance of the content and the instructions dictating how to handle the content may be encapsulated in one or more first overlay packets. Each first overlay packet includes an overlay header, which dictates a tunnel initiation and tunnel destination within the network. The overlay packet(s) may be generated by a tunnel device in the network prior to arriving at the split edge device.

In a further embodiment, the instance of the content and the instructions may be encrypted within the first overlay packet(s). In this embodiment, the split edge device may intercept and de-capsulate the first overlay packet(s) to obtain encrypted data. Then, the split edge device may decrypt, using one or more encryption keys, the encrypted data to obtain the instance of the content and the instructions. Thereafter, the split edge device may re-encrypt, using the one or more encryption keys, the instance of the content to obtain encrypted content and then re-encapsulate the encrypted content in one or more second overlay packets. Each second overlay packet includes the overlay header indicating the destination of the tunnel.

In this embodiment, the split edge device may transmit the one or more second overlay packets that include the encrypted content to the first application operating on the first end-user device in order to deliver the instance of the content.

According to a further approach, the split edge device may receive the one or more encryption keys via the network prior to decrypting the encrypted content. In an approach, the application device may send the one or more encryption keys via the network or some other device in or out of the network may provide the one or more encryption keys.

In one approach, P-GW/S-GW device(s) may communicate the one or more encryption keys to one or more split edge devices in a network. Each split edge device may use the one or more encryption keys to decrypt and re-encrypt a payload of various overlay packets for retrieving instructions from the overlay packet(s) and still delivering the content to end-user devices.

In a particular approach, a split edge device may act as a proxy between the access end-point of the overlay tunnel and the P-GW/S-GW device(s). In other words, an encrypted GTP tunnel between the access end-point and the split edge device is maintained, along with another separate encrypted GTP tunnel between the split edge device and the P-GW/S-GW device(s). In this case all upstream and downstream traffic goes through the split edge device. Such a proxy arrangement may also be used to support encryption through one tunnel (e.g., on a first side of the split edge device) and not through the other tunnel (e.g., on the other side of the split edge device).

Variations of the disclosed embodiments are also possible, and the explicit description thereof in this document is not required in order to provide a person having ordinary skill in the art with the ability to conceive of such variations when reading the present descriptions.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

4. MISCELLANEOUS; EXTENSIONS

Embodiments are directed to a system with one or more devices that include a hardware processor and that are configured to perform any of the operations described herein and/or recited in any of the claims below. In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5. HARDWARE OVERVIEW

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, datacenter servers, networking devices or any other device that incorporates hard-wired and/or program logic to implement the techniques.

Figure 11:
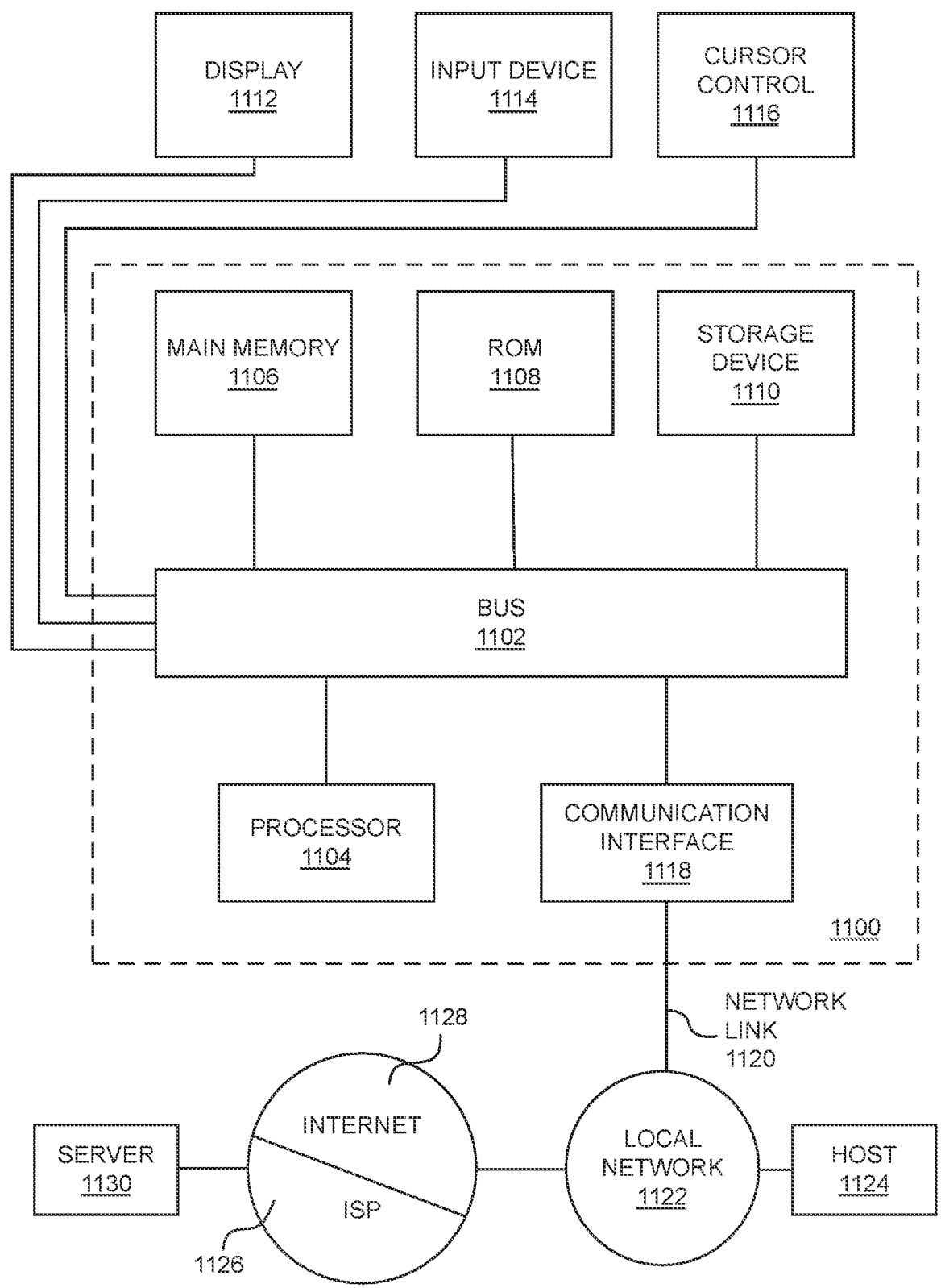
FIG. 11 shows a block diagram of an example computing system that may implement the features and processes of FIGS. 1-10.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk or solid state disk, is provided and coupled to bus 1102 for storing information and instructions.

Computer system 1100 may be coupled via bus 1102 to a display 1112, such as a liquid crystal display (LCD), plasma display, electronic ink display, cathode ray tube (CRT) monitor, or any other kind of device for displaying information to a computer user. An input device 1114, including alphanumeric and other keys, may be coupled to bus 1102 for communicating information and command selections to processor 1104. Alternatively or in addition, the computer system 1100 may receive user input via a cursor control 1116, such as a mouse, a trackball, a trackpad, a touchscreen, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane. The display 1112 may be configured to receive user input via one or more pressure-sensitive sensors, multi-touch sensors, and/or gesture sensors. Alternatively or in addition, the computer system 1100 may receive user input via a microphone, video camera, and/or some other kind of user input device (not shown).

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, solid-state or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 1100 can receive the data from the network and place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118. The received code may be executed by processor 1104 as it is received, and/or stored in storage device 1110, or other non-volatile storage for later execution.

What is claimed is:

1. A method, comprising:
   receiving, by an application device, an application-layer request from at least one end-user device;
   responsive to the application-layer request: determining, by the application device, whether to instruct a split edge device to perform one or more actions on packets sent to and received from the at least one end-user device after the receipt of the application-layer request by the application device, the split edge device being connected to the at least one end-user device and configured to manage traffic sent to and received from the at least one end-user device and receive commands from the application device; and
   sending, by the application device, a set of first commands to the split edge device, wherein the set of first commands comprise the one or more actions.

2. The method as recited in claim 1, wherein the split edge device is a member of a distributed network having a plurality of split edge devices, and wherein the split edge device is integrated with a network device in the distributed network.

3. The method as recited in claim 2, further comprising: handling, by the application device, all management, processing, security, and policy decisions for an application layer across the network.

4. The method as recited in claim 2, wherein the split edge device is coupled to a plurality of end-user devices, and wherein application-layer duties are shared across the application device and the plurality of split edge devices.

5. The method as recited in claim 1, wherein the set of first commands are encapsulated in an overlay packet comprising an overlay header by a tunnel device prior to being delivered to the split edge device, and wherein the method further comprises:
   intercepting and de-capsulating, by the split edge device, the overlay packet to obtain the set of first commands.

6. The method as recited in claim 1, wherein the set of first commands instruct the split edge device to apply one or more data management policies to the packets received from or sent to the at least one end-user device.

7. The method as recited in claim 1, further comprising: controlling, by the application device, a transport stack for managing communications with the at least one end-user device.

8. The method as recited in claim 1, further comprising: controlling, by the application device, an application stack to process application-layer requests from the at least one end-user device.

9. The method as recited in claim 1, wherein the application-layer request comprises a reference to first content to be provided to the at least one end-user device, the method further comprising:
   sending, by the application device, a set of second commands to the split edge device, the set of second commands: (a) comprising a reference to a location of an instance of the first content in a content cache, and (b) instructing the split edge device to deliver the instance of the first content to the at least one end-user device.

10. The method as recited in claim 9, wherein the set of first commands instruct the split edge device to perform the one or more actions on the first content prior to delivering the first content to the at least one end-user device, and wherein the split edge device comprises the content cache configured to store content data for delivery to one or more end-user devices.

11. A system, comprising:
at least one hardware processor; and
a non-transitory computer readable medium comprising a set of instructions, which when executed by the hardware processor, causes the hardware processor to perform a method comprising:
receiving, by an application device, an application-layer request from at least one end-user device;
responsive to the application-layer request: determining, by the application device, whether to instruct a split edge device to perform one or more actions on packets sent to and received from the at least one end-user device after the receipt of the application-layer request by the application device, the split edge device being connected to the at least one end-user device and configured to manage traffic sent to and received from the at least one end-user device and receive one or more commands from the application device; and
sending, by the application device, a set of first commands to the split edge device, wherein the set of first commands comprise the one or more actions.

12. The system as recited in claim 11, wherein the split edge device is a member of a distributed network having a plurality of split edge devices, and wherein the split edge device is integrated with a network device in the distributed network.

13. The system as recited in claim 12, wherein the method further comprises handling, by the application device, all management, processing, security, and policy decisions for an application layer across the network.

14. The system as recited in claim 12, wherein the split edge device is a coupled to a plurality of end-user devices, and wherein application-layer duties are shared across the application device and the plurality of split edge devices.

15. The system as recited in claim 11, wherein the set of first commands instruct the split edge device to apply one or more data management policies to the packets received from or sent to the at least one end-user device.

16. The system as recited in claim 11, wherein the method further comprises controlling, by the application device, a transport stack for managing communications with the at least one end-user device.

17. The system as recited in claim 11, wherein the method further comprises:
controlling, by the application device, an application stack to process application-layer requests from the at least one end-user device.

18. The system as recited in claim 11, wherein the application-layer request comprises a reference to first content to be provided to the at least one end-user device, and wherein the method further comprises:
sending, by the application device, a set of second commands to the split edge device, the set of second commands: (a) comprising a reference to a location of an instance of the first content in a content cache, and (b) instructing the split edge device to deliver the instance of the first content to the at least one end-user device.

19. The system as recited in claim 18, wherein the set of first commands instruct the split edge device to perform the one or more actions on the first content prior to delivering the first content to the at least one end-user device, and wherein the split edge device comprises the content cache configured to store content data for delivery to one or more end-user devices.

20. A non-transitory computer readable medium comprising a set of instructions, which when executed by at least one hardware processor, causes the at least one hardware processor to perform a method comprising:
receiving, by an application device, an application-layer request from at least one end-user device;
responsive to the application-layer request: determining, by the application device, whether to instruct a split edge device to perform one or more actions on packets sent to and received from the at least one end-user device after the receipt of the application-layer request by the application device, the split edge device being connected to the at least one end-user device and configured to manage traffic sent to and received from the at least one end-user device and receive commands from the application device; and
sending, by the application device, a set of first commands to the split edge device, wherein the set of first commands comprise the one or more actions.

21. An apparatus, comprising memory comprising programmed instructions stored in the memory and one or more processors configured to be capable of executing the programmed instructions stored in the memory to:
receive, by an application device, an application-layer request from at least one end-user device;
responsive to the application-layer request: determine, by the application device, whether to instruct a split edge device to perform one or more actions on packets sent to and received from the at least one end-user device after the receipt of the application-layer request by the application device, the split edge device being connected to the at least one end-user device and configured to manage traffic sent to and received from the at least one end-user device and receive commands from the application device; and
sending, by the application device, a set of first commands to the split edge device, wherein the set of first commands comprise the one or more actions.

* * * * *